(12) United States Patent
Tsukuda et al.

(10) Patent No.: US 7,974,479 B2
(45) Date of Patent: Jul. 5, 2011

(54) ENCODING APPARATUS, METHOD, AND COMPUTER PRODUCT, FOR CONTROLLING INTRA-REFRESH

(75) Inventors: Noriaki Tsukuda, Fukuoka (JP); Takato Ohashi, Fukuoka (JP); Yousuke Yamaguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 915 days.

(21) Appl. No.: 11/907,521

(22) Filed: Oct. 12, 2007

(65) Prior Publication Data

US 2008/0260266 A1 Oct. 23, 2008

(30) Foreign Application Priority Data

Oct. 23, 2006 (JP) .................................. 2006-287922

(51) Int. Cl.
*G06K 9/36* (2006.01)
*H04N 7/26* (2006.01)
*G06K 9/46* (2006.01)
(52) U.S. Cl. .................... 382/232; 375/240.02
(58) Field of Classification Search .................. 382/232, 382/233, 236, 238; 375/240.02, 240.03, 375/240.08, 240.12, 240.13, 240.133, 240.24, 375/240.27, E7.026, E7.133; 348/384.1, 348/408.1
See application file for complete search history.

(56) References Cited

U.S. PATENT DOCUMENTS

| | | | |
|---|---|---|---|
| 5,726,711 A * | 3/1998 | Boyce ......................... | 348/408.1 |
| 6,002,802 A | 12/1999 | Chujoh et al. | |
| 6,125,144 A | 9/2000 | Matsumura et al. | |
| 6,188,729 B1 | 2/2001 | Perkins | |
| 6,259,736 B1 | 7/2001 | Chujoh et al. | |
| 6,317,518 B1 | 11/2001 | Enari | |
| 6,940,903 B2 * | 9/2005 | Zhao et al. ............... | 375/240.08 |
| 7,110,452 B2 * | 9/2006 | Katsavounidis et al. | 375/240.08 |
| 7,693,220 B2 * | 4/2010 | Wang et al. ................ | 375/240.2 |
| 2002/0071052 A1 * | 6/2002 | Itoh et al. .................... | 348/384.1 |
| 2006/0251177 A1 * | 11/2006 | Webb ........................ | 375/240.27 |
| 2007/0030894 A1 * | 2/2007 | Tian et al. ................ | 375/240.02 |
| 2007/0160137 A1 * | 7/2007 | Guo et al. .................. | 375/240.1 |
| 2008/0247469 A1 * | 10/2008 | Vadapalli et al. ........ | 375/240.27 |
| 2008/0260266 A1 * | 10/2008 | Tsukuda et al. ............... | 382/232 |
| 2009/0022218 A1 * | 1/2009 | Kim et al. ................ | 375/240.03 |
| 2009/0279603 A1 * | 11/2009 | Chen et al. ................ | 375/240.02 |
| 2010/0067578 A1 * | 3/2010 | Nakagawa ............... | 375/240.13 |

FOREIGN PATENT DOCUMENTS

| | | |
|---|---|---|
| JP | 5-328330 | 12/1993 |
| JP | 06-217273 | 8/1994 |
| JP | 06-217282 | 8/1994 |
| JP | 07-298272 | 11/1995 |

(Continued)

OTHER PUBLICATIONS

Korean Office Action for corresponding Korea Application 10-2007-95804; mailed Mar. 23, 2009.

(Continued)

*Primary Examiner* — Amir Alavi
(74) *Attorney, Agent, or Firm* — Staas & Halsey LLP

(57) ABSTRACT

An encoding apparatus encodes a picture by inserting an intra-refresh area into a portion of the picture periodically based on an intra-refresh period. An encoding-status monitoring unit monitors an encoding status of the picture. A refresh-area control unit changes at least one of the intra-refresh area and the intra-refresh period based on the encoding status monitored by the encoding-status monitoring unit.

10 Claims, 16 Drawing Sheets

FOREIGN PATENT DOCUMENTS

| | | |
|---|---|---|
| JP | 09-130807 | 5/1997 |
| JP | 09-163378 | 6/1997 |
| JP | 09-247682 | 9/1997 |
| JP | 11-220733 | 8/1999 |
| JP | 2001-359102 | 12/2001 |
| JP | 2003-87800 | 3/2003 |
| KR | 10-2004-0035012 | 4/2004 |

OTHER PUBLICATIONS

Chinese Office Action issued Jul. 10, 2009 in corresponding Chinese Patent Application 200710166842.4.

Japanese Office Action for corresponding Japanese Application 2006-287922; date mailed Dec. 14, 2010.

* cited by examiner

$$\frac{W+w}{A} \times \alpha \leqq \frac{b}{B}$$

SIZE OF ONE FRAME: A
WIDTH OF INTRA-REFRESH AREA: W
WIDTH OF ADDED
 INTRA-REFRESH AREA: w
AMOUNT OF INFORMATION
 GENERATED FROM PICTURE: B
AMOUNT OF INFORMATION
 GENERATED FROM
 INTRA-REFRESH AREA: b
CORRECTION VALUE: α

(2)

$$w \leqq \frac{Ab}{\alpha B} - W$$

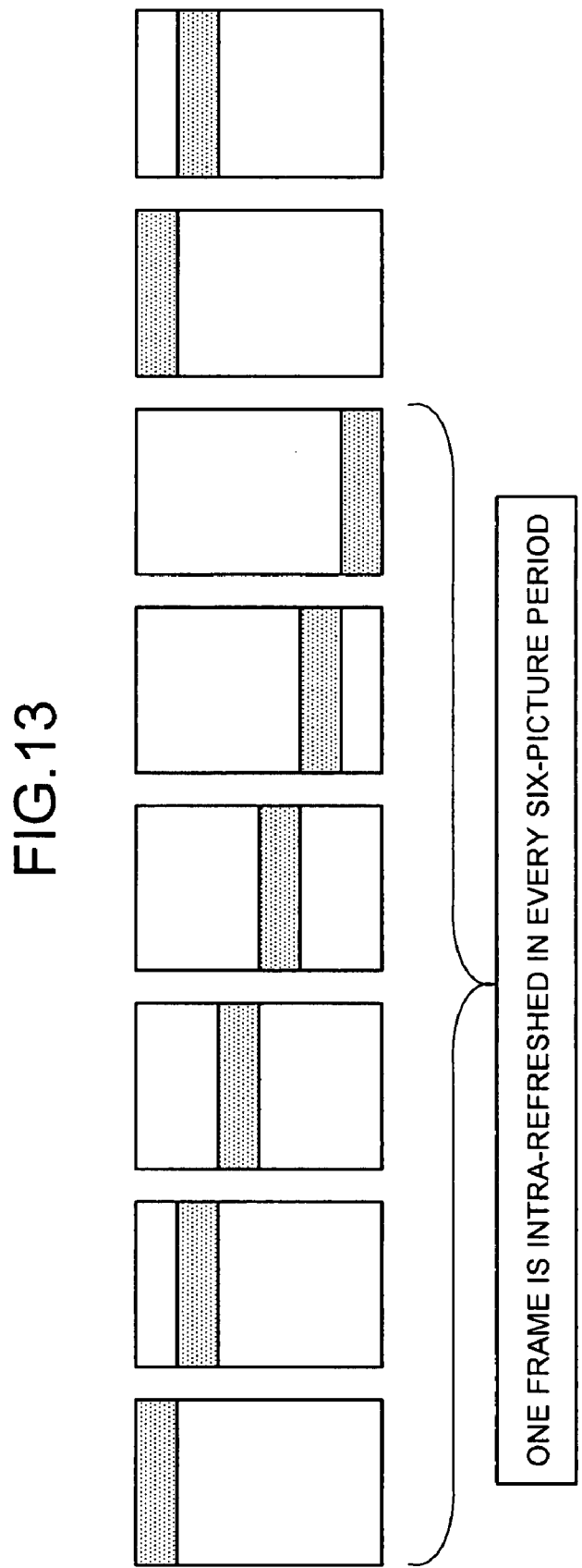

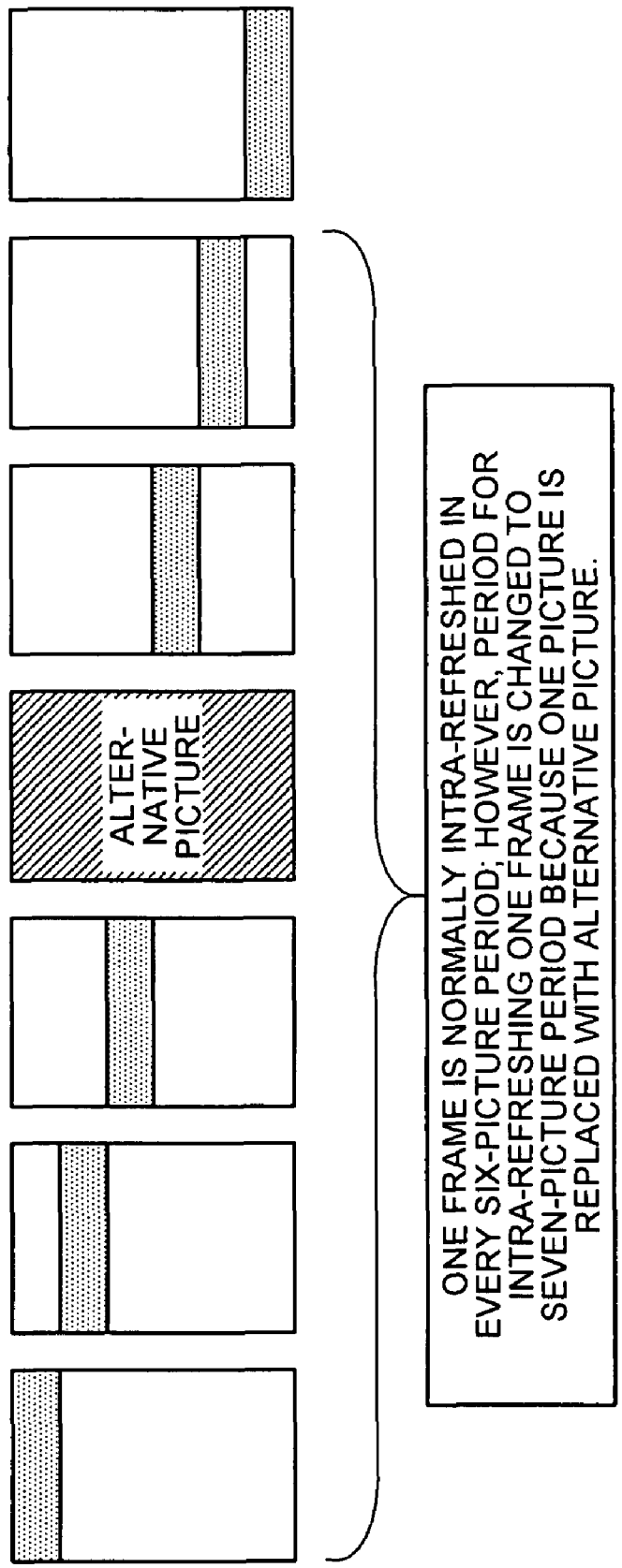

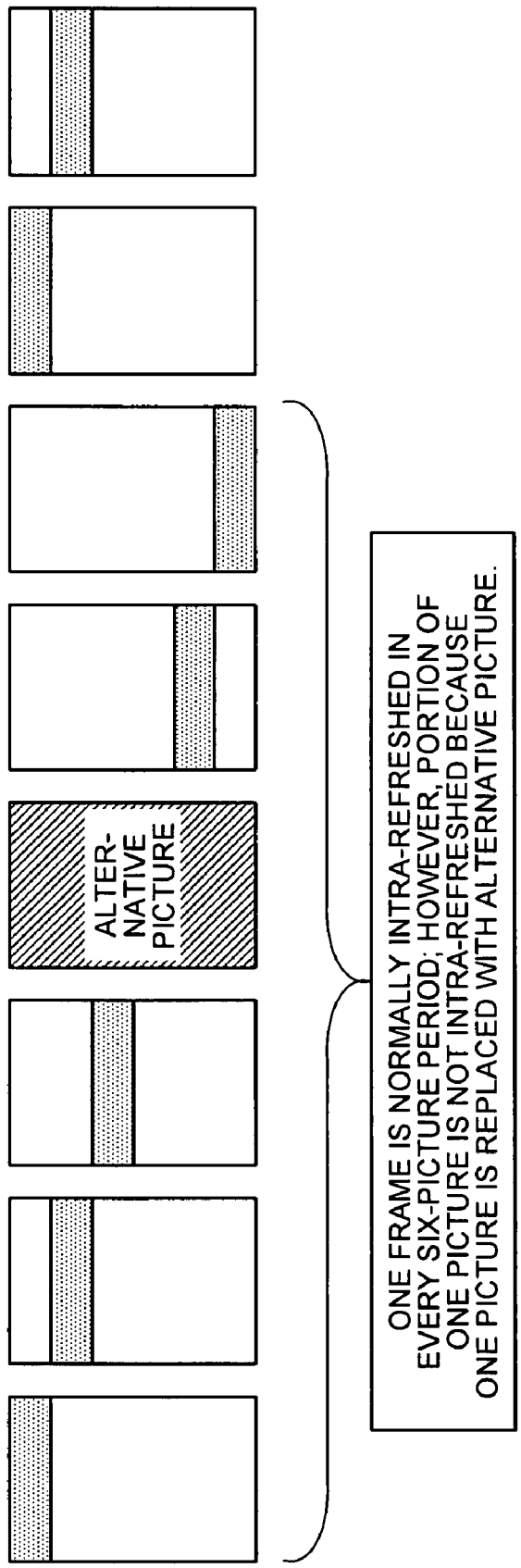

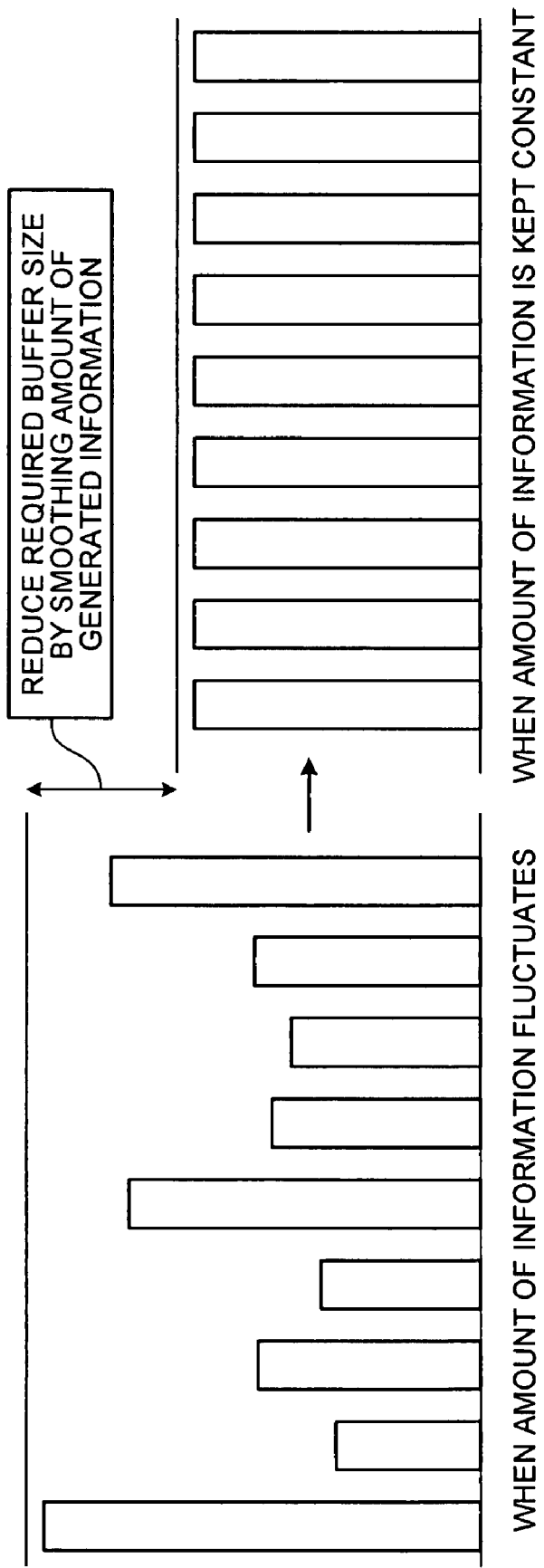

ENCODING APPARATUS, METHOD, AND COMPUTER PRODUCT, FOR CONTROLLING INTRA-REFRESH

BACKGROUND OF THE INVENTION

1. Field of the Invention

The present invention relates to an encoding apparatus, an encoding method, and a computer product for encoding an image by inserting an intra-refresh area into a portion of the image periodically based on an intra-refresh period.

2. Description of the Related Art

In a conventional picture transfer system including an encoding apparatus for displaying a video shot by a camera on a monitor in real time as shown in FIG. 12, a monitor frame is split into a plurality of pictures, and an intra-refresh area is inserted into each picture as shown in FIG. 13, to shorten a time interval (a delay time) from the instant each picture is shot by the camera to the instant the picture is displayed on the monitor.

In case an intra-refresh area is not inserted into a picture because of an overrun of a processing time due to a lack of a processing capacity of the picture transfer system or an overflow of a buffer due to an excess of an amount of generated information, the picture without the intra-refresh area inserted fails to be refreshed. To solve the problem, various technologies for eliminating a leak of the intra-refresh area have been developed.

For example, a technology is disclosed in Japanese Patent Application Laid-open No. 2003-87800, in which an intra-refresh width according to a picture or a frame is manually changed following an instruction from an external device or the like.

Furthermore, according to a technology disclosed in Japanese Patent Application Laid-open No. 2001-359102, an intra-refresh area is determined based on a map of previously-refreshed areas, a generated bit amount, or the like, when performing an intra-refresh.

However, in the technology disclosed in Japanese Patent Application Laid-open No. 2003-87800, when encoded data of a picture cannot be transmitted properly due to an overrun of a processing time or an amount of information and the picture is replaced with a picture having a smaller bit amount or a skip picture prepared in advance, as an alternative picture, the intra-refresh cannot be performed or an intra-refresh period varies, which results in a degradation of an image quality or a refresh performance of the entire frame.

Specifically, in a case shown in FIG. 14, an intra-refresh area supposed to be inserted into the picture replaced with the alternative picture is inserted into a subsequent picture after the alternative picture, so that the intra-refresh period is changed from a six-picture period to a seven-picture period. In a case shown in FIG. 15, an intra-refresh area supposed to be inserted into the picture replaced with the alternative picture is skipped, so that an area where the intra-refresh area is not inserted is not refreshed, although the intra-refresh period is not changed, which results in the same problem.

Furthermore, in the technology disclosed in Japanese Patent Application Laid-open No. 2001-359102, because an intra-refresh area is fixed based on previous information, when a picture having a high encoding difficulty or a large amount of information is encoded, a coding efficiency and an image quality of the picture are degraded.

Specifically, to achieve a low-delay picture transfer system, it is preferable to minimize a receiving-side buffer by maintaining an amount of generated information per picture constant to smooth amounts of generated information as shown in FIG. 16. However, it is necessary to limit an amount of generated information to be stored in the receiving-side buffer even if a picture to be encoded has a high encoding difficulty due to a complicated design. In this case, a quantized value of the picture is increased to reduce the amount of generated information. However, if the quantized value varies by each scene, the picture also fluctuates. Consequently, in the case where a picture having a high encoding difficulty or a large amount of information is encoded, if an intra-refresh area is fixed based on previous information, a coding efficiency and an image quality of the picture are degraded.

In this manner, according to the conventional technologies, an intra-refresh area is fixed by an instruction from an external source or based on previous information, so that when a picture is encoded, an intra-refresh area or an intra-refresh period cannot be appropriately changed depending on an input signal (such as a picture). Thus, a coding efficiency and an image quality of the picture are degraded.

SUMMARY OF THE INVENTION

It is an object of the present invention to at least partially solve the problems in the conventional technology.

An encoding apparatus according to one aspect of the present invention is for encoding a picture by inserting an intra-refresh area into a portion of the picture periodically based on an intra-refresh period. The encoding apparatus includes an encoding-status monitoring unit that monitors an encoding status of the picture; and a refresh-area control unit that changes at least one of the intra-refresh area and the intra-refresh period based on the encoding status monitored by the encoding-status monitoring unit.

An encoding method according to another aspect of the present invention is for encoding a picture by inserting an intra-refresh area into a portion of the picture periodically based on an intra-refresh period. The encoding method includes monitoring an encoding status of the picture; and changing at least one of the intra-refresh area and the intra-refresh period based on the encoding status monitored at the monitoring.

A computer-readable recording medium according to still another aspect of the present invention stores therein a computer program for encoding a picture by inserting an intra-refresh area into a portion of the picture periodically based on an intra-refresh period. The computer program causes a computer to execute monitoring an encoding status of the picture; and changing at least one of the intra-refresh area and the intra-refresh period based on the encoding status monitored at the monitoring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is an example of an Inequality for calculating an intra-refresh area;

FIGS. 12 to 16 are schematic diagrams for explaining a conventional technology.

DETAILED DESCRIPTION OF THE PREFERRED EMBODIMENTS

Figure 1:
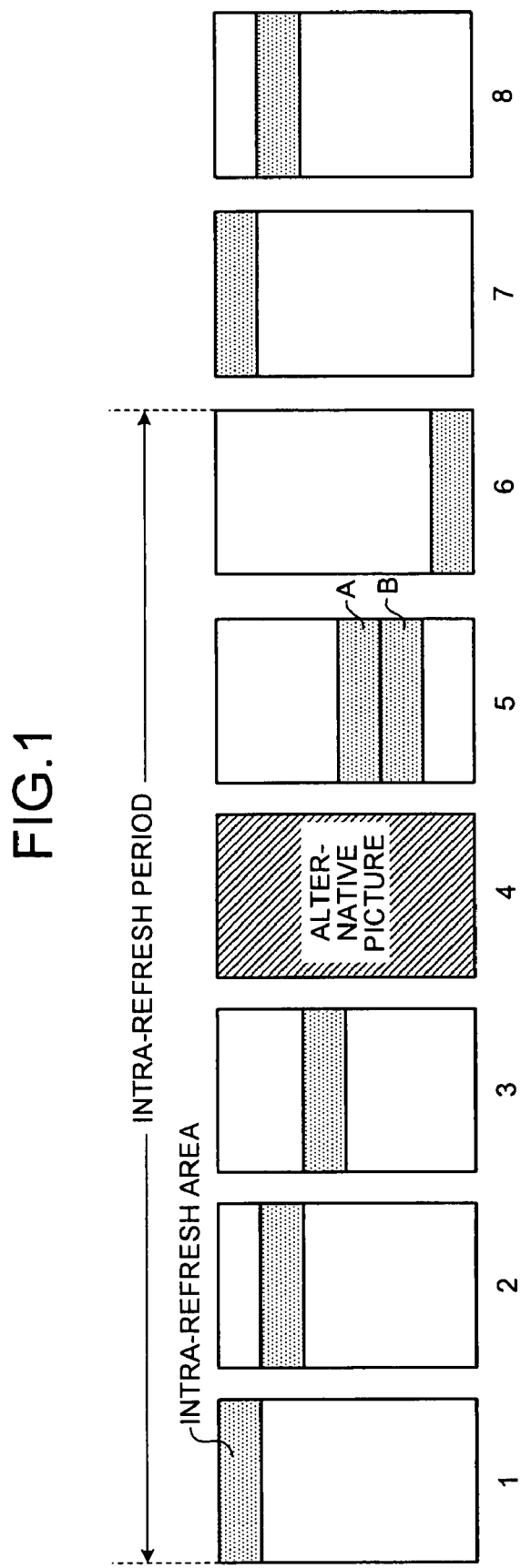
FIG. 1 is a schematic diagram for explaining an outline of an encoding apparatus according to a first embodiment of the present invention.

Exemplary embodiments of the present invention are explained in detail below with reference to the accompanying drawings.

First, major terminologies used in the embodiments are explained below. To achieve a low-delay data transfer, an "intra-refresh area" is inserted into data to encode the data. Specifically, an intra-coded area (an intra-frame coded area), which is referred as "the intra-refresh area" in the embodiments, having a larger amount of generated information than that of an inter-coded area (an interframe coded area) is not concentrated on a single picture as an intra-coded picture, but the intra-coded area is split and inserted into a plurality of pictures in a direction of time to encode the pictures. At this time, an amount of generated information of each picture is equalized so that a data-receiving side of a buffer can be slimmed down. As a result, it is possible to shorten a time period from a time point that encoded data is input to a time point that the encoded data is displayed on a frame. Incidentally, the intra-refresh area can be decoded independently from other frames. Even if data of other frame is mixed into the intra-refresh area, or a data error or a data missing occurs in the intra-refresh area, the intra-refresh area is not affected.

To prevent a degradation of a coding efficiency or an image quality of a picture, one whole frame, as the intra-refresh area, is not to be refreshed at one time. The intra-refresh area is split into a plurality of intra-refresh areas, and each of the intra-refresh areas is sequentially inserted into a portion of the picture to encode the picture. A period for inserting all the intra-refresh areas into portions of pictures is referred to as an "intra-refresh period". For example, in a case in which the intra-refresh period is a six-frame period, i.e., one whole frame is split into six frames as intra-refresh areas, the six intra-refresh areas are sequentially inserted into six pictures respectively to encode the pictures.

An outline of an encoding apparatus according to a first embodiment of the present invention is explained below with reference to FIG. 1.

In a case in which an intra-refresh period is defined as a period of every six pictures, i.e., one frame is equally split into six pictures and then the six pictures are sequentially intra-refreshed, the encoding apparatus encodes the frame by inserting an area having the same size as each of the six pictures, as an intra-refresh area, into each of the six pictures.

In this manner, when a received frame is encoded, the encoding apparatus according to the first embodiment encodes the frame by inserting the intra-refresh area into a portion of the frame periodically based on the intra-refresh period. Therefore, it is possible to achieve a high coding efficiency by preventing a degradation of an image quality of the frame.

Specifically, the encoding apparatus monitors an encoding status of the frame, and determines whether a picture is replaced with a picture having a small bit amount or a skip picture as an alternative picture. In a case shown in FIG. 1, the encoding apparatus determines that the first picture is not replaced with the alternative picture, and then encodes the first picture by inserting the intra-refresh area thereinto. In this manner, the encoding apparatus sequentially determines that the second picture and the third picture are not the alternative picture, and then respectively encodes the second and third pictures by inserting the intra-refresh area thereinto. When receiving the fourth picture, the encoding apparatus determines that the fourth picture is replaced with the alternative picture.

Then, the encoding apparatus controls an intra-refresh area A that is supposed to be inserted into the fourth picture to be inserted into the subsequent fifth picture, which is not determined as the alternative picture, together with an intra-refresh area B to be inserted into the fifth picture. Namely, the encoding apparatus encodes the fourth picture as the alternative picture without inserting the intra-refresh area thereinto, and encodes the fifth picture by inserting the intra-refresh areas A and B thereinto.

If both the fourth and fifth pictures are the alternative pictures and the sixth picture is not replaced with the alternative picture, the encoding apparatus encodes the sixth picture by inserting the intra-refresh areas that are supposed to be inserted into the fourth and fifth pictures into the six picture together with the intra-refresh area to be inserted into the sixth picture in a lump sum.

In this manner, in the case in which one frame is split into six pictures and each of the six pictures is sequentially intra-refreshed, even if the intra-refresh area cannot be inserted into any of the six pictures because the picture is replaced with the alternative picture, the encoding apparatus according to the first embodiment controls the intra-refresh area to be inserted into a subsequent picture that is not replaced with the alternative picture not to change the intra-refresh period. Therefore, the encoding apparatus according to the first embodiment can controls the intra-refresh area to be selectively inserted into a picture. Thus, it is possible to achieve a high coding efficiency by preventing a degradation of an image quality of the picture.

Figure 2:
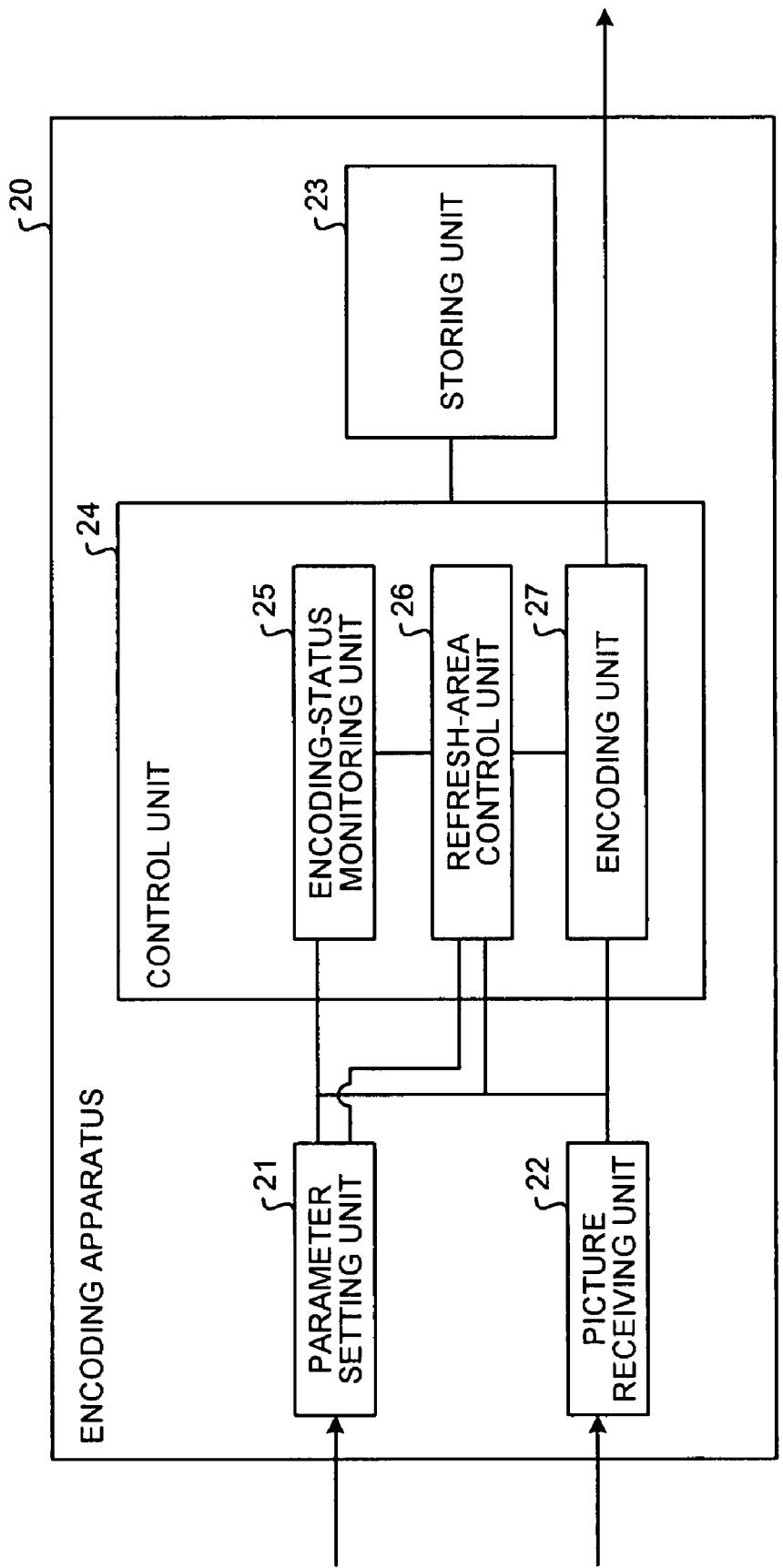
FIG. 2 is a block diagram of the encoding apparatus according to the first embodiment.

A configuration of the encoding apparatus according to the first embodiment is explained in detail below with reference to FIG. 2. FIG. 2 is a block diagram of an encoding apparatus 20 according to the first embodiment. The encoding apparatus 20 includes a parameter setting unit 21, a picture receiving unit 22, a storing unit 23, and a control unit 24.

The parameter setting unit 21 sets an intra-refresh period. Specifically, the parameter setting unit 21 stores therein parameters for defining the intra-refresh period, which are input via an external device, such as a keyboard, a mouse, or a microphone. For example, the parameter setting unit 21 stores therein "six pictures" as the intra-refresh period.

The picture receiving unit 22 is an input interface for receiving a picture input from an external source. Specifically, when receiving a picture from the external source, the picture receiving unit 22 outputs the received picture as an input picture to an encoding unit 27. The storing unit 23 stores therein data and programs those required for each processing. Specifically, the storing unit 23 stores therein an Internet protocol (IP) address of the encoding apparatus 20, information on apparatuses connected to the encoding apparatus 20, and the like.

The control unit 24 includes an internal memory in which a program for defining processing procedures, necessary data, and the like are stored. Furthermore, the control unit 24 includes an encoding-status monitoring unit 25, a refresh-area control unit 26, and the encoding unit 27.

The encoding-status monitoring unit 25 monitors an encoding status, and determines whether a received picture is replaced with a picture having a small bit amount or a skip picture as the alternative picture. If the received picture is not replaced with the alternative picture, the encoding-status monitoring unit 25 outputs the picture to the refresh-area control unit 26. If the received picture is replaced with the alternative picture, the encoding-status monitoring unit 25 outputs the picture to the encoding unit 27, and also informs the refresh-area control unit 26 that the picture is replaced with the alternative picture.

For example, in the case shown in FIG. 1, the encoding-status monitoring unit 25 determines that the first to third pictures are not the alternative picture, and outputs the first to third pictures to the refresh-area control unit 26. When receiving the fourth picture, the encoding-status monitoring unit 25 determines that the fourth picture is replaced with the alternative picture, and outputs the fourth picture to the encoding unit 27, and also informs the refresh-area control unit 26 that the fourth picture is replaced with the alternative picture.

When informed that the picture is determined as the alternative picture, the refresh-area control unit 26 controls the intra-refresh area that is supposed to be inserted into the picture to be inserted into a subsequent picture after the alternative picture.

For example, in the case shown in FIG. 1, the refresh-area control unit 26 is informed that the fourth picture is replaced with the alternative picture by the encoding-status monitoring unit 25. Then, when receiving the fifth picture from the encoding-status monitoring unit 25, the refresh-area control unit 26 inserts the intra-refresh area A that is supposed to be inserted into the fourth picture as the alternative picture into the fifth picture, which is not replaced with the alternative picture, together with the intra-refresh area B to be inserted into the fifth picture. Namely, the intra-refresh area A is not inserted into the alternative picture, so that the refresh-area control unit 26 inserts the intra-refresh areas A and B into the fifth picture.

When receiving a picture from the encoding-status monitoring unit 25 or the refresh-area control unit 26, the encoding unit 27 encodes the received picture. Specifically, when receiving the alternative picture from the encoding-status monitoring unit 25 or a picture in which the intra-refresh area is inserted from the refresh-area control unit 26, the encoding unit 27 encodes the received picture onto encoded data, and then transmits the encoded data to an external apparatus.

Figure 3:
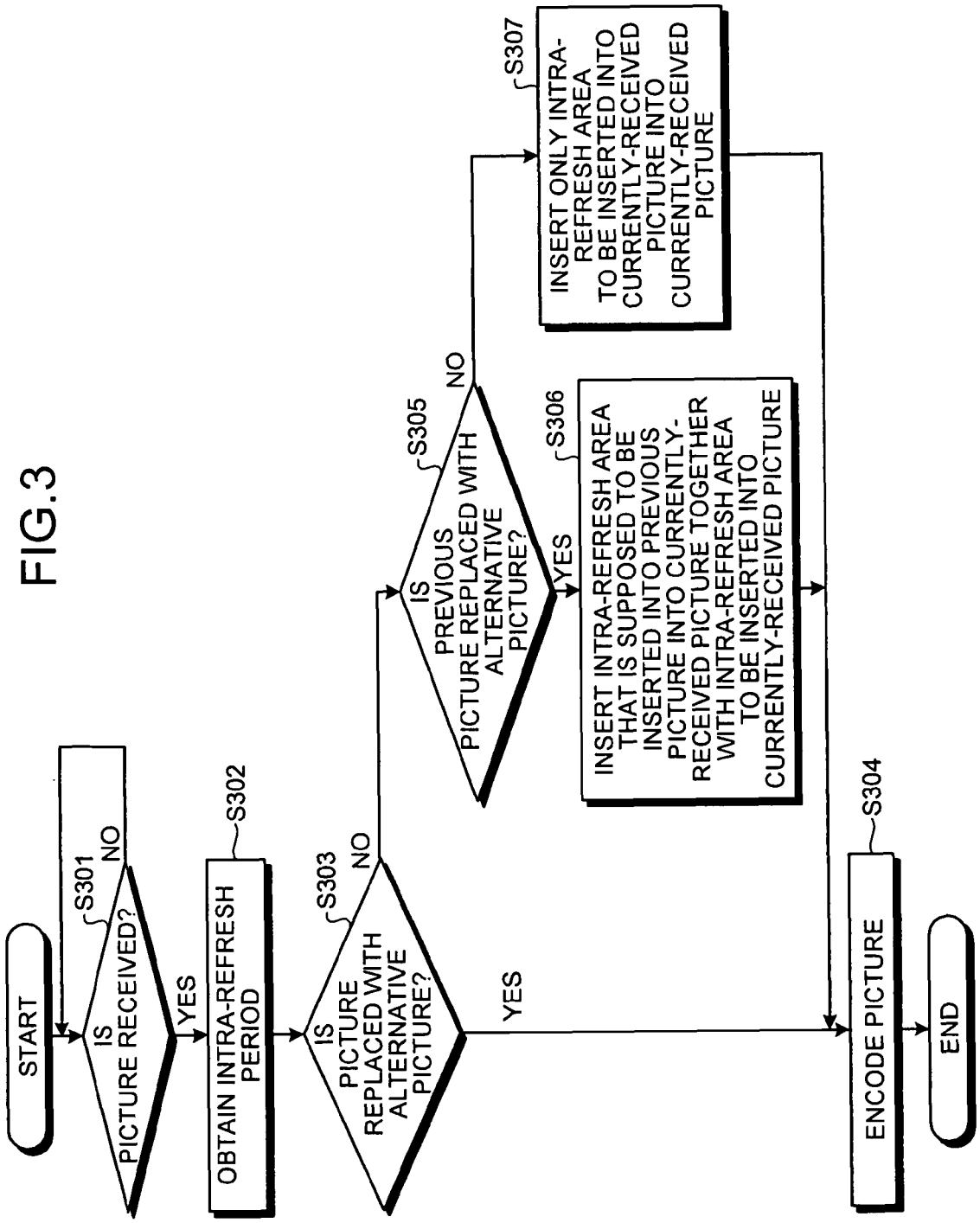
FIG. 3 is a flowchart of an encoding process performed by the encoding apparatus according to the first embodiment.

Then, a process performed by the encoding apparatus 20 is explained in detail below with reference to FIG. 3. FIG. 3 is a flowchart of an encoding process performed by the encoding apparatus 20.

When receiving a picture (YES at step S301), the refresh-area control unit 26 in the encoding apparatus 20 obtains an intra-refresh period from the parameter setting unit 21 (step S302). Then, the encoding-status monitoring unit 25 monitors an encoding status, and determines whether the received picture is replaced with a picture having a small bit amount or a skip picture as the alternative picture (step S303).

If the received picture is replaced with the alternative picture (YES at step S303), the encoding-status monitoring unit 25 outputs the picture to the encoding unit 27. When receiving the picture from the encoding-status monitoring unit 25, the encoding unit 27 encodes the received picture (step S304).

If the received picture is not replaced with the alternative picture (NO at step S303), the encoding-status monitoring unit 25 outputs the picture to the refresh-area control unit 26. When receiving the picture from the encoding-status monitoring unit 25, the refresh-area control unit 26 determines whether a previous picture is replaced with the alternative picture (i.e., whether the encoding-status monitoring unit 25 informs that the previous picture is replaced with the alternative picture) (step S305).

If the previous picture is replaced with the alternative picture (YES at step S305), the refresh-area control unit 26 inserts the intra-refresh area that is supposed to be inserted into the previous picture into the currently-received picture together with the intra-refresh area to be inserted into the currently-received picture (step S306). Then, the refresh-area control unit 26 outputs the picture in which the two intra-refresh areas are inserted to the encoding unit 27. When receiving the picture from the refresh-area control unit 26, the encoding unit 27 encodes the received picture (step S304).

If the previous picture is not replaced with the alternative picture (NO at step S305), the refresh-area control unit 26 inserts only the intra-refresh area to be inserted into the currently-received picture into the currently-received picture (step S307). Then, the refresh-area control unit 26 outputs the picture to the encoding unit 27. When receiving the picture from the refresh-area control unit 26, the encoding unit 27 encodes the received picture (step S304).

In this manner, the encoding apparatus according to the first embodiment monitors an encoding status, and controls the intra-refresh area and/or the intra-refresh period based on the monitored encoding status. Therefore, it is possible to achieve a high coding efficiency by preventing a degradation of an image quality of the picture. For example, in a case in which one frame is split into six pictures and each of the six pictures is sequentially intra-refreshed, even if the intra-refresh area cannot be inserted into any of the six pictures because the picture is replaced with the alternative picture, the encoding apparatus can control the intra-refresh area to be inserted into a subsequent picture not to change the intra-refresh period. In other words, the encoding apparatus can selectively insert the intra-refresh area into a picture. Thus, it is possible to achieve a high coding efficiency by preventing a degradation of an image quality of the picture.

Furthermore, in a case in which a design of a picture varies dramatically, the encoding apparatus controls the intra-refresh area to be narrowed down so as to extend the intra-refresh period. As a result, a coding efficiency increases, and a degree of the quantization decreases, and thereby improving an image quality of the picture. In other words, the encoding apparatus can selectively change a size of the intra-refresh area depending on a received picture. Thus, it is possible to achieve a high coding efficiency by preventing a degradation of an image quality of the picture.

Furthermore, the encoding apparatus monitors an encoding status, and determines whether a picture is replaced with a picture having a small bit amount or a skip picture as the alternative picture. If the picture is replaced with the alternative picture, the encoding apparatus controls the intra-refresh area that is supposed to be inserted into the picture replaced with the alternative picture to be inserted into a subsequent picture, which is not replaced with the alternative picture, together with the intra-refresh area to be inserted into the subsequent picture. Therefore, the encoding apparatus can surely insert all the intra-refresh areas into pictures without changing the intra-refresh period.

For example, in a case in which one frame is split into six pictures and each of the six pictures is sequentially intra-refreshed, if the third picture is replaced with the alternative picture, the encoding apparatus inserts the intra-refresh area that is supposed to be inserted into the third picture into the fourth picture together with the intra-refresh area to be inserted into the fourth picture. Therefore, the encoding apparatus can surely insert all the intra-refresh areas into pictures without changing the intra-refresh period.

Furthermore, if it is determined that a picture is replaced with the alternative picture, the encoding apparatus controls the intra-refresh area that is supposed to be inserted into the picture replaced with the alternative picture to be inserted into a subsequent picture, which is not replaced with the alternative picture, together with the intra-refresh area to be inserted into the subsequent picture. Therefore, the encoding apparatus can surely insert all the intra-refresh areas into pictures without changing the intra-refresh period.

For example, in a case in which one frame is split into six pictures and each of the six pictures is sequentially intra-refreshed, if the third and fourth pictures are replaced with the alternative pictures, the encoding apparatus controls the intra-refresh areas that are supposed to be inserted into the third and fourth pictures to be inserted into the fifth picture, which is not replaced with the alternative picture, together with the intra-refresh area to be inserted into the fifth picture. Therefore, the encoding apparatus can surely insert all the intra-refresh areas into pictures without changing the intra-refresh period.

As described above, when it is determined that a picture is replaced with the alternative picture, the encoding apparatus according to the first embodiment controls the intra-refresh area that is supposed to be inserted into the picture replaced with the alternative picture to be inserted into a subsequent picture, but the present invention is not limited to the first embodiment. The intra-refresh area that is supposed to be inserted into the picture replaced with the alternative picture can be split into a plurality of intra-refresh areas, and the split intra-refresh areas can be inserted into a plurality of subsequent pictures.

Figure 4:
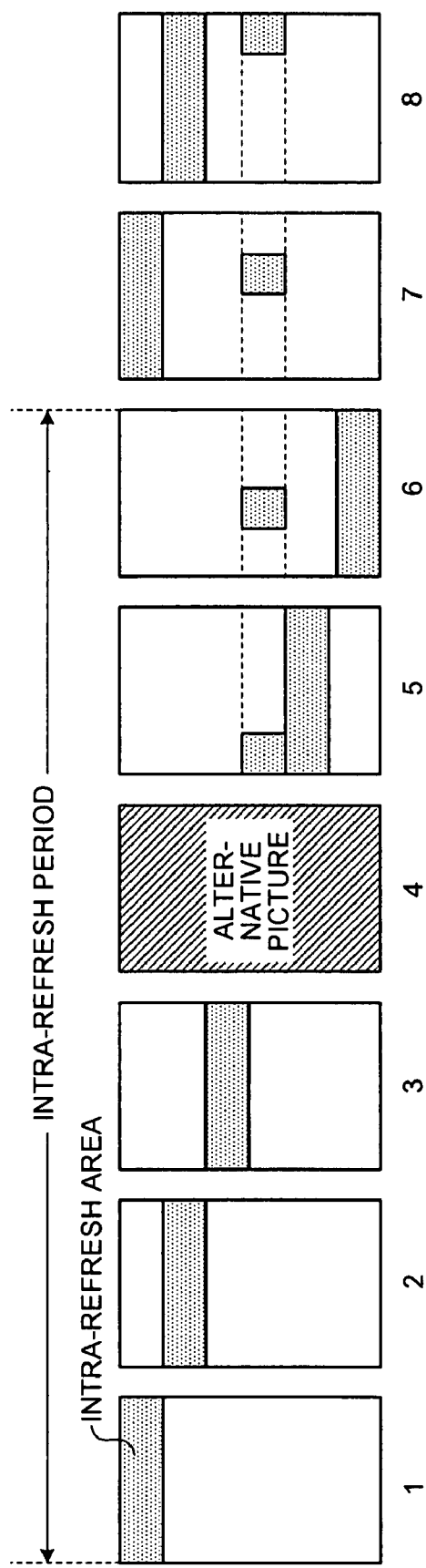
FIG. 4 is a schematic diagram for explaining an outline of an encoding apparatus according to a second embodiment of the present invention.
Figure 6:
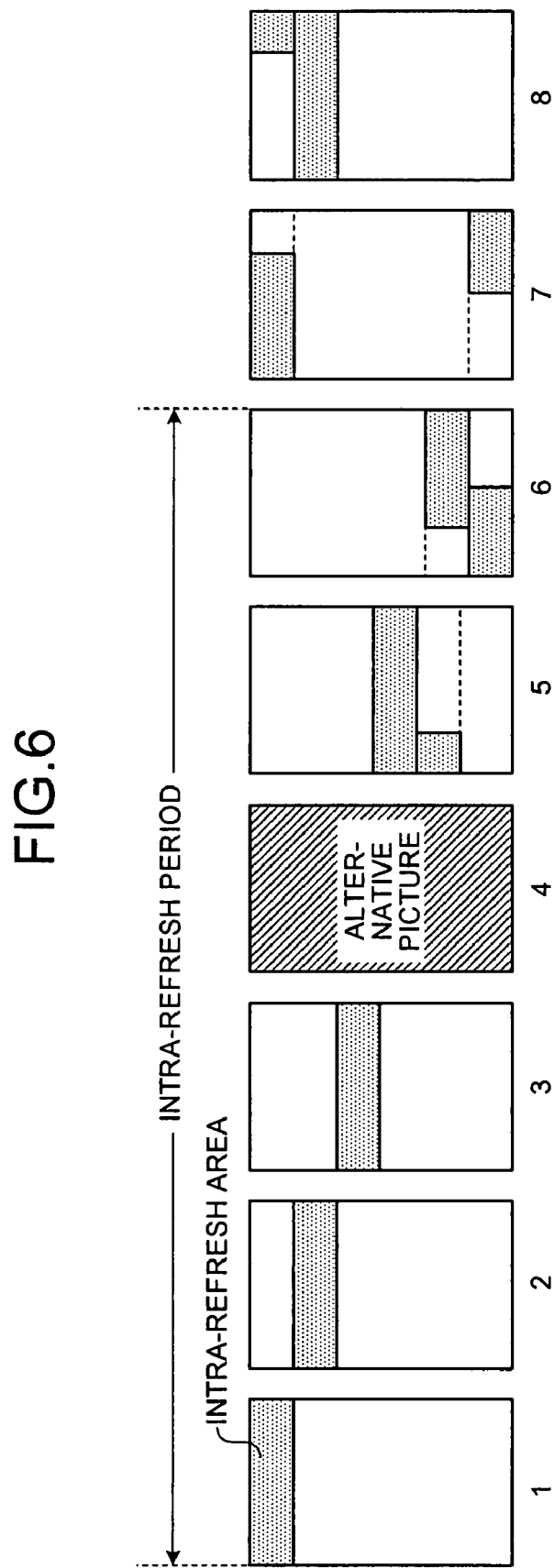
FIG. 6 is a schematic diagram for explaining a case in which the intra-refresh area shown in FIG. 5 is expanded.

An encoding apparatus according to a second embodiment of the present invention is explained below with reference to FIGS. 4 to 6. In this case, when it is determined that a picture is replaced with the alternative picture, the encoding apparatus according to the second embodiment splits the intra-refresh area that is supposed to be inserted into the picture replaced with the alternative picture into a plurality of intra-refresh areas, and inserts the split intra-refresh areas into a plurality of subsequent pictures. FIG. 4 is a schematic diagram for explaining an outline of the encoding apparatus according to the second embodiment. FIG. 5 is an example of an Inequality for calculating the intra-refresh area. FIG. 6 is a variation of the intra-refresh area shown in FIG. 5.

In a case shown in FIG. 4, the encoding apparatus monitors an encoding status, and determines whether a picture is replaced with a picture having a small bit amount or a skip picture as the alternative picture. Specifically, when receiving the first picture, the encoding apparatus monitors determines that the first picture is not replaced with the alternative picture, and then encodes the first picture by inserting the intra-refresh area thereinto. In the same manner as the first picture, the encoding apparatus sequentially determines that the second and third pictures are not replaced with the alternative picture, and then encodes the second and third pictures respectively by inserting the intra-refresh area thereinto.

Then, the encoding apparatus determines that the fourth picture is replaced with the alternative picture, and splits the intra-refresh area that is supposed to be inserted into the fourth picture into a plurality of intra-refresh areas, and inserts the split intra-refresh areas respectively into subsequent pictures that are not replaced with the alternative picture. Specifically, after the fourth picture as the alternative picture is encoded, when receiving the fifth picture, the encoding apparatus compares, as shown in FIG. 5-(1), a proportion of an amount of generated information of the intra-refresh area to an amount of generated information of a picture (hereinafter, a "value X") with a correction value times a proportion of a total width of the original intra-refresh area and the newly-added split intra-refresh area to a size of a whole frame (hereinafter, a "value Y"), and calculates the value Y not to exceed the value X. Then, within the range defined by the intra-refresh period, the encoding apparatus obtains "w<2 W" as an upper-limit value of an Inequality shown in FIG. 5-(2).

Namely, as shown in FIG. 4, the intra-refresh area that is supposed to be inserted into the fourth picture is equally split into four split intra-refresh areas, and the four split intra-refresh areas are respectively inserted into the fifth to eighth pictures. Therefore, it is possible to equalize image qualities of the fifth to eighth pictures, and also to insert all the intra-refresh areas into pictures without changing the intra-refresh period. In the above example, the intra-refresh area that is supposed to be inserted into the fourth picture replaced with the alternative picture is equally split into four split intra-refresh areas, and the four split intra-refresh areas are respectively inserted into the fifth to eighth pictures, but the present invention is not limited to the example. For example, it is also possible to split the intra-refresh area into three split intra-refresh areas equally. In this case, the three split intra-refresh areas are respectively inserted into the fifth to seventh pictures. As long as all the split intra-refresh areas that are supposed to be inserted into the fourth picture replaced with the alternative picture are inserted into pictures preceding the tenth picture which intra-refresh area is located at the same position as that is supposed to be inserted into the fourth picture, the intra-refresh area can be equally split into any portions.

The above process of calculating the intra-refresh area and inserting the calculated intra-refresh area into subsequent pictures is explained in detail below by using the units shown in FIG. 2. When the encoding-status monitoring unit 25 determines that the fourth picture is replaced with the alternative picture, the encoding-status monitoring unit 25 informs the refresh-area control unit 26 that the fourth picture is replaced with the alternative picture. Then, the refresh-area control unit 26 splits the intra-refresh area that is supposed to be inserted into the fourth picture into four split intra-refresh areas equally, and inserts the four split intra-refresh areas into the fifth to eighth pictures respectively, and then outputs the fifth to eighth pictures to the encoding unit 27. When receiving the fifth to eighth pictures, the encoding unit 27 sequentially encodes the fifth to eighth pictures.

As described above, the intra-refresh area that is supposed to be inserted into the fourth picture replaced with the alternative picture is equally split into a plurality of split intra-refresh areas, and the split intra-refresh areas are inserted into subsequent pictures respectively. Alternatively, as shown in FIG. 6, all the intra-refresh areas after the alternative picture, that are supposed to be inserted into subsequent pictures preceding a picture which intra-refresh area is located at the same position as that is supposed to be inserted into the fourth picture, can be split and inserted into the subsequent pictures located from the fifth picture to the picture which intra-refresh area is located at the same position as that is supposed to be inserted into the fourth picture.

In this manner, in the encoding apparatus according to the second embodiment, when a picture is determines as the alternative picture, the intra-refresh area that is supposed to be inserted into the picture is split into a plurality of split intra-refresh areas and respectively inserted into subsequent pictures that are not the alternative picture. Therefore, it is possible to control the intra-refresh areas to be inserted into pictures without changing the intra-refresh period by keeping image qualities of the pictures.

For example, in a case in which one frame is split into six pictures and the six pictures are sequentially intra-refreshed, if the fourth picture is replaced with the alternative picture, the intra-refresh area cannot be inserted into the fourth picture. Therefore, the encoding apparatus controls the intra-refresh area that is supposed to be inserted into the fourth picture to be split into two split intra-refresh areas so that the two split intra-refresh areas are respectively inserted into the fifth and sixth pictures. As a result, a high coding efficiency can be achieved as compared with in a case in which the intra-refresh area that is supposed to be inserted into the fourth picture is inserted into the fifth picture in a lump sum. Moreover, all the intra-refresh areas can be surely inserted into pictures without changing the intra-refresh period by keeping image qualities of the pictures.

The encoding apparatus according to the first and second embodiments controls the intra-refresh area not to change the intra-refresh period, but the present invention is not limited to the first and second embodiments. It is also applicable to a case in which the encoding apparatus controls both the intra-refresh period and the intra-refresh area to be changed.

An encoding apparatus according to a third embodiment of the present invention that controls both the intra-refresh period and the intra-refresh areas to be changed is explained below with reference to FIGS. 7 to 10.

Figure 7:
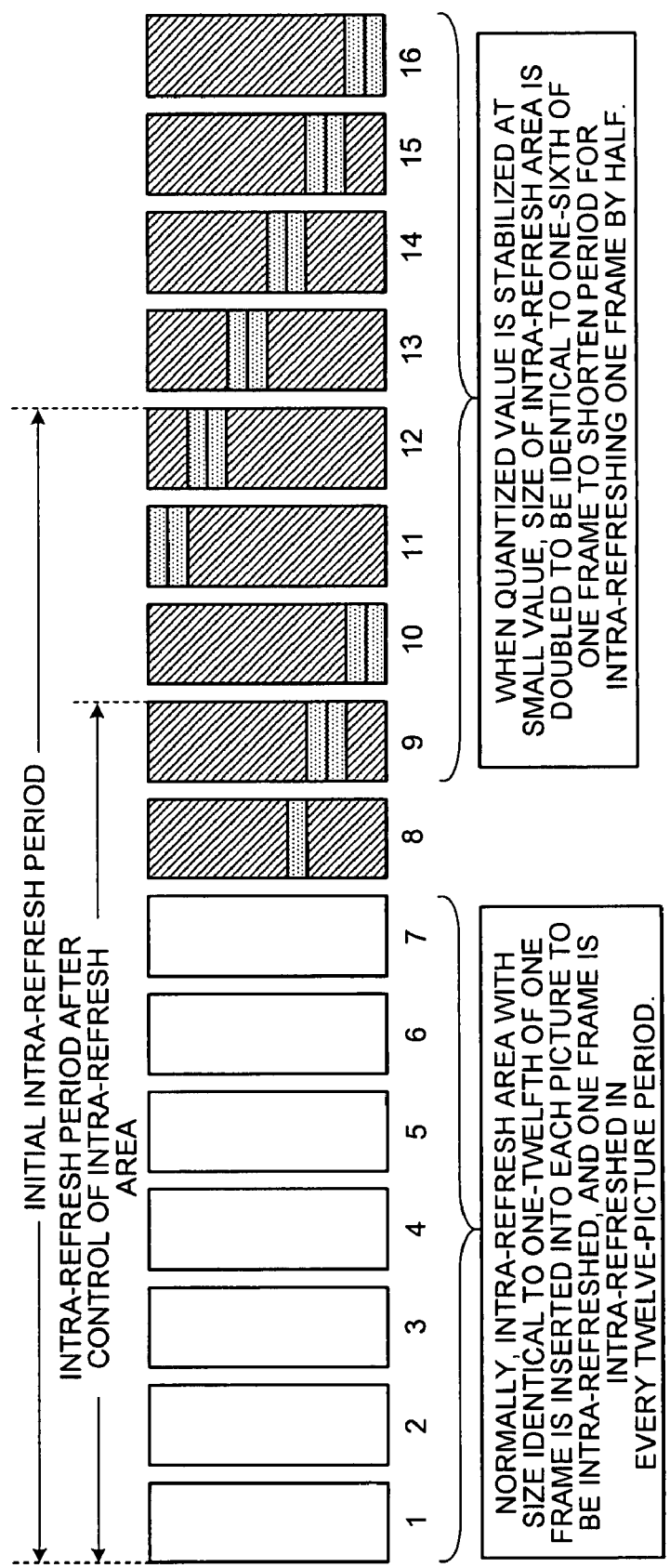
FIG. 7 is a schematic diagram for explaining an outline of an encoding apparatus according to a third embodiment of the present invention.

FIG. 7 is a schematic diagram for explaining an outline of the encoding apparatus according to the third embodiment. In this case, the intra-refresh area is split into twelve split intra-refresh areas as a twelve-picture period of the intra-refresh period.

The encoding apparatus monitors an encoding status, and determines an encoding difficulty that indicates a level of difficulty in encoding a picture based on how an image quality of a received picture varies from that of a previously-received picture. Specifically, the encoding apparatus obtains an amount of generated information or a quantized value of a received picture, and determines how an image quality of the received picture varies from that of a previously-received picture based on the obtained amount of generated information or the quantized value, and further determines whether an encoding difficulty of the received picture is lower than that of the previously-received picture. Alternatively, the encoding apparatus can obtain an activity or a differential absolute value, that indicate how a received picture changes from a previously-received picture, instead of the amount of generated information or the quantized value to determine an encoding difficulty of a picture.

If the encoding difficulty of the received picture is below a minimum threshold, the encoding apparatus controls the intra-refresh area to be expanded so as to shorten the intra-refresh period. If the encoding difficulty of the received picture exceeds a maximum threshold, the encoding apparatus controls the intra-refresh area to be narrowed so as to extend the intra-refresh period. Specifically, when receiving the first picture, the encoding apparatus determines whether an amount of fluctuation in an image quality of the first picture with respect to a previously-received picture is either one of above a predetermined upper-limit value or below a predetermined lower-limit value. If it is determined that the amount of fluctuation is within the range of the upper-limit value to the lower-limit value, the encoding apparatus encodes the first picture by inserting the intra-refresh area thereinto as usual. In this case shown in FIG. 7, the second to eighth pictures are determined that an amount of fluctuation is within the range of the upper-limit value to the lower-limit value, so that the encoding apparatus sequentially encodes the second to eighth pictures by inserting the intra-refresh area thereinto in the same manner as the first picture.

When receiving the ninth picture, the encoding apparatus determines that an amount of fluctuation in an image quality of the ninth picture with respect to the eighth picture is below the lower-limit value, i.e., the ninth picture has a lower encoding difficulty as compared with that of the eighth picture. Therefore, the encoding apparatus doubles the intra-refresh area to be inserted into the ninth picture so as to shorten the intra-refresh period. Afterwards, a doubled size of the intra-refresh area and the shortened intra-refresh period are sustained. Incidentally, it is not limited to the doubled size of the intra-refresh area. As long as the coding efficiency does not decrease, a size of the intra-refresh area can be changed.

In this manner, the encoding apparatus according to the third embodiment determines a coding efficiency of a received picture based on an amount of fluctuation in an image quality of the received picture with respect to that of a previously-received picture (for example, to be determined based on an amount of generated information or a quantized value). If the amount of fluctuation is large, the encoding apparatus controls the intra-refresh area to be expanded so as to shorten the intra-refresh period. Therefore, the intra-refresh area can be surely inserted into the picture by preventing a degradation of an image quality of the picture.

Figure 8:
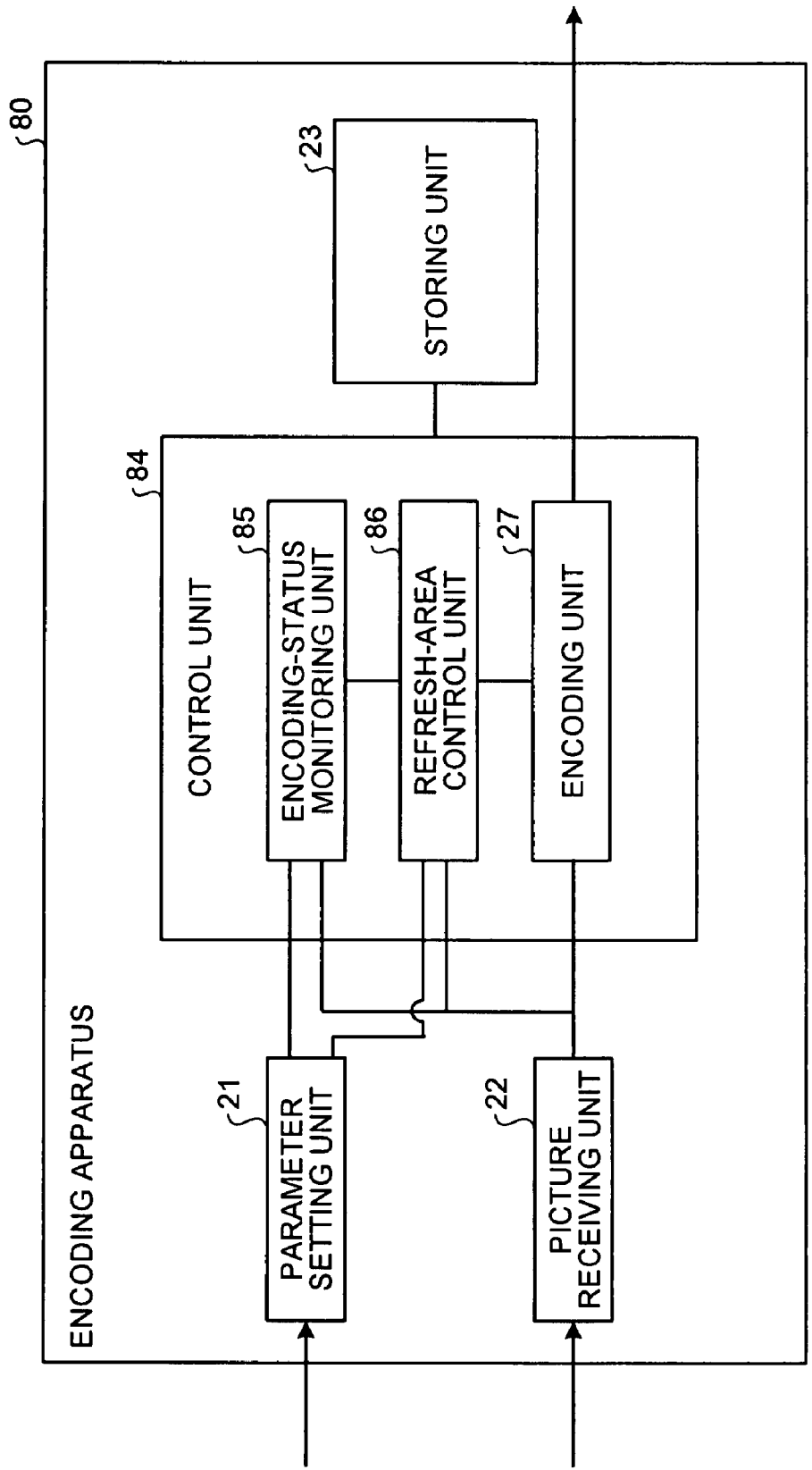
FIG. 8 is a block diagram of the encoding apparatus according to the third embodiment.

A configuration of an encoding apparatus 80 according to the third embodiment is explained below with reference to FIG. 8. FIG. 8 is a block diagram of the encoding apparatus 80.

The encoding apparatus 80 includes the parameter setting unit 21, the picture receiving unit 22, the storing unit 23, and a control unit 84. The control unit 84 includes an encoding-status monitoring unit 85, a refresh-area control unit 86, and the encoding unit 27. The portions identical to those in FIG. 2 for the first embodiment are denoted with the same reference numerals and the description of those portions is omitted.

The encoding-status monitoring unit 85 monitors an amount of fluctuation in an image quality of a received picture with respect to that of a previously-received picture, and determines an encoding difficulty of the received picture, which indicates a level of difficulty in encoding the received picture. Specifically, the encoding-status monitoring unit 85 obtains an amount of generated information or a quantized value of the received picture, which indicates how an image quality of the received picture varies from that of the previously-received picture, and then determines whether the received picture has a lower encoding difficulty than that of the previously-received picture. Instead of the amount of generated information or the quantized value, the encoding-status monitoring unit 85 can obtain an activity or a differential absolute value of the received picture, which indicates how the received picture changes from the previously-received picture, to determine an encoding difficulty of the received picture.

If the encoding difficulty of the received picture is below the minimum threshold, the refresh-area control unit 86 controls the intra-refresh area to be expanded so as to shorten the intra-refresh period. Specifically, if the encoding difficulty of the received picture is below the minimum threshold, the refresh-area control unit 86 doubles the intra-refresh area to be inserted into each picture as shown in FIG. 7 so as to shorten the intra-refresh period.

Figure 10:
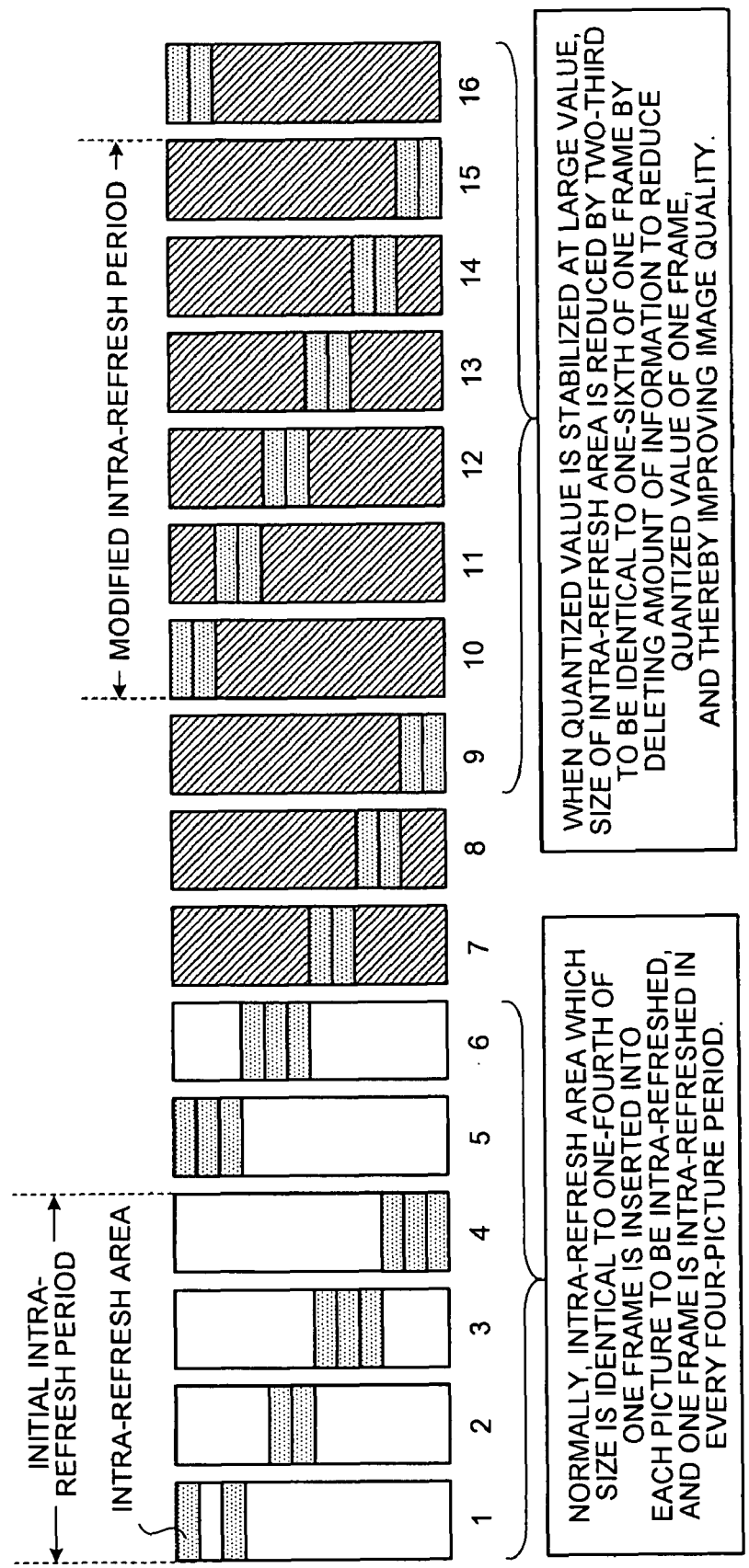
FIG. 10 is a schematic diagram for explaining a case in which an intra-refresh area is narrowed to extend an intra-refresh period.

On the other hand, if the encoding difficulty exceeds the maximum threshold, the refresh-area control unit 86 controls the intra-refresh area to be narrowed so as to extend the intra-refresh period. For example, in a case of a four-picture period of the intra-refresh period originally as shown in FIG. 10, if an encoding difficulty of the sixth picture exceeds the maximum threshold, the refresh-area control unit 86 controls the intra-refresh area to be inserted into each picture to be narrowed by two-thirds of the intra-refresh area so as to extend the intra-refresh period by half (to be a six-picture period of the intra-refresh period), but not limited to two-thirds of the intra-refresh area. As long as a coding efficiency does not decrease, a size of the intra-refresh area can be changed.

In a case in which an activity or a differential absolute value of a received picture, that indicates how the received picture changes from a previously-received picture, is obtained to determine an encoding difficulty of the received picture, if the activity or the differential absolute value of the received picture exceeds the upper-limit value, the refresh-area control unit 86 controls the intra-refresh area to be expanded so as to shorten the intra-refresh period, on the other hand, if the activity or the differential absolute value of the received picture is below the lower-limit value, the refresh-area control unit 86 controls the intra-refresh area to be narrowed so as to extend the intra-refresh period.

Figure 9:
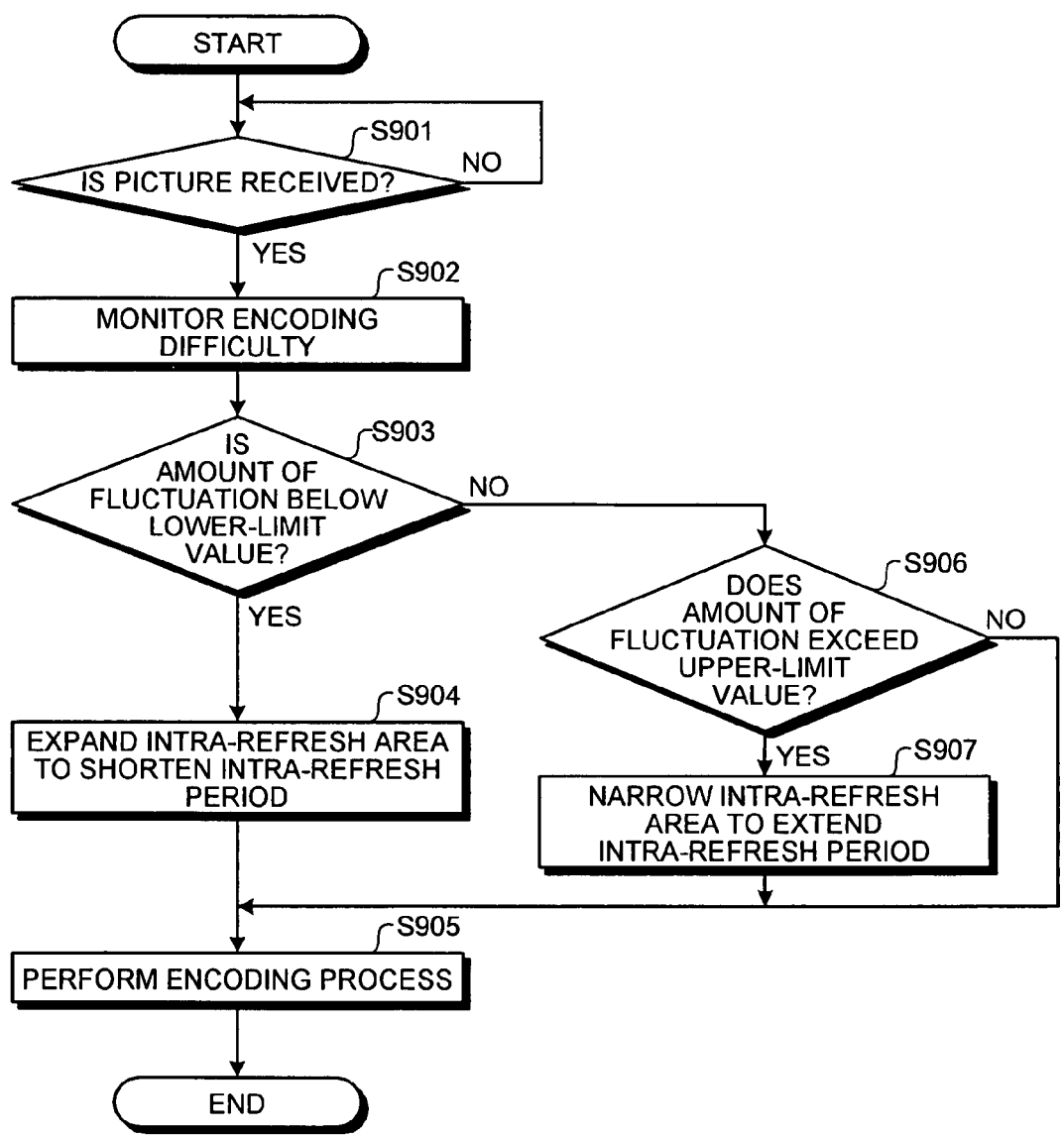
FIG. 9 is a flowchart of an encoding process performed by the encoding apparatus according to the third embodiment.

An encoding process performed by the encoding apparatus 80 according to the third embodiment is explained in detail below with reference to FIG. 9. FIG. 9 is a flowchart of the encoding process performed by the encoding apparatus 80.

When receiving a picture (step S901), the encoding-status monitoring unit 85 monitors an amount of fluctuation in an image quality of the received picture with respect to that of a previously-received picture (such as an amount of generated information or a quantized value) to determine an encoding difficulty that indicates a level of difficulty in encoding the received picture (step S902). Then, the refresh-area control unit 86 determines whether the amount of fluctuation is below the lower-limit value (step S903).

If the amount of fluctuation is below the lower-limit value (YES at step S903), the refresh-area control unit 86 controls the intra-refresh area to be expanded so as to shorten the intra-refresh period (step S904), and performs the encoding process (step S905).

On the other hand, if the amount of fluctuation is not below the lower-limit value (NO at step S903), the refresh-area control unit 86 further determines whether the amount of fluctuation exceeds the upper-limit value (step S906).

If the amount of fluctuation exceeds the upper-limit value (YES at step S906), the refresh-area control unit 86 controls the intra-refresh area to be narrowed so as to extend the intra-refresh period (step S907), and performs the encoding process (step S905).

If the amount of fluctuation does not exceed the upper-limit value (NO at step S906), the refresh-area control unit 86 controls neither the intra-refresh area nor the intra-refresh period, and performs the encoding process (step S905).

In this manner, the encoding apparatus according to the third embodiment monitors an encoding status, and determines an encoding difficulty of a received picture, which indicates a level of difficulty in encoding the received picture.

If the determined encoding difficulty of the received picture is below the minimum threshold, the encoding apparatus controls the intra-refresh area to be expanded so as to shorten the intra-refresh period. If the determined encoding difficulty of the received picture exceeds the maximum threshold, the encoding apparatus controls the intra-refresh area to be narrowed so as to extend the intra-refresh period. Therefore, the intra-refresh area can be surely inserted into the picture by preventing a degradation of an image quality of the picture due to the encoding process.

For example, if the received picture has a high encoding difficulty, the encoding apparatus controls the intra-refresh area to be narrowed (decreased), and if the received picture has a low encoding difficulty, the encoding apparatus controls the intra-refresh area to be expanded (increased). As a result, the encoding apparatus can prevent the intra-refresh area from being forcedly-inserted into a picture, and thus it is possible to prevent a degradation of an image quality of the picture.

Furthermore, the encoding apparatus according to the third embodiment monitors an amount of fluctuation in an image quality of a received picture with respect to that of a previously-received picture to determine an encoding difficulty of the received picture. If the amount of fluctuation is below the lower-limit value, the encoding apparatus controls the intra-refresh area to be expanded so as to shorten the intra-refresh period, and if the amount of fluctuation exceeds the upper-limit value, the encoding apparatus controls the intra-refresh area to be narrowed so as to extend the intra-refresh period. Therefore, the intra-refresh area can be surely inserted into the picture by preventing a degradation of an image quality of the picture due to the encoding process.

For example, when the encoding apparatus obtains an amount of fluctuation in an image quality of a received picture with respect to that of a previously-received picture (such as an amount of generated information or a quantized value) as an encoding difficulty of the received picture, if the amount of fluctuation is large, the encoding apparatus controls the intra-refresh area to be expanded so as to shorten the intra-refresh period, so that the intra-refresh area can be surely inserted into the picture by preventing a degradation of an image quality of the picture due to the encoding process. On the other hand, if the amount of fluctuation is small, the encoding apparatus controls the intra-refresh area to be narrowed so as to extend the intra-refresh period, so that the intra-refresh area can be surely inserted into the picture by preventing a degradation of an image quality of the picture due to the encoding process.

The present invention is not limited to the above first to third embodiments. Other applications of the present invention are described below.

A case in which one picture is replaced with the alternative picture is explained in the first embodiment, but the present invention is not limited to only one number of the alternative picture. The present invention can be applied to a case in which a plurality of continuous pictures is replaced with the alternative pictures in the same manner as the first embodiment. Specifically, the encoding apparatus controls the intra-refresh areas, which are supposed to be inserted into the pictures replaced with the alternative pictures, to be inserted into a subsequent picture next to the last alternative picture in a lump sum. For example, in a case in which the fourth and fifth pictures are replaced with the alternative pictures, the encoding apparatus encodes the sixth picture by inserting the intra-refresh areas, which are supposed to be inserted into the fourth and fifth pictures, into the sixth picture together with the intra-refresh area to be inserted into the sixth picture in a lump sum. Namely, a total size of the intra-refresh area inserted into the sixth picture is three times larger than that of the intra-refresh area to be normally-inserted into a picture.

An amount of generated information or a quantized value is obtained to determine an encoding difficulty of a received picture in the third embodiment, but the present invention is not limited to the amount of generated information or the quantized value. Instead of the amount of generated information or the quantized value, an activity or a differential absolute value of a received picture can be obtained. In this case, the encoding apparatus monitors an amount of fluctuation indicating how the received picture changes from a previously-received picture. If the amount of fluctuation exceeds the upper-limit value, the encoding apparatus controls the intra-refresh area to be expanded so as to shorten the intra-refresh period. If the amount of fluctuation is below the lower-limit value, the encoding apparatus controls the intra-refresh area to be narrowed so as to extend the intra-refresh period. Namely, the controls of the intra-refresh area and the intra-refresh period are different from that are in the case in which the amount of generated information or the quantized value is monitored in the third embodiment.

In this manner, the intra-refresh area can be surely inserted into a picture by preventing a degradation of an image quality of the picture due to the encoding process. The encoding apparatus determines how a received picture changes from a previously-received picture (i.e., whether an amount of fluctuation in an activity or a differential absolute value of the received picture is large or small) to determine an encoding difficulty of the received picture. If the amount of fluctuation is large, the encoding apparatus controls the intra-refresh area to be expanded so as to shorten the intra-refresh period, so that the intra-refresh area can be surely inserted into the picture by preventing a degradation of an image quality of the picture due to the encoding process. On the other hand, if the amount of fluctuation is small, the encoding apparatus controls the intra-refresh area to be narrowed so as to extend the intra-refresh period, so that the intra-refresh area can be surely inserted into the picture by preventing a degradation of an image quality of the picture due to the encoding process.

Each of elements included in the apparatuses is conceptually depicted in the drawings, so that the elements need not be physically arranged as shown in the drawings. Therefore, each of the elements can be fully or partially dispersed or integrated functionally or physically depending on loads or usage statuses in any unit. Moreover, each of processing functions can be fully or partially realized by a central processing unit (CPU) or a computer program to be executed by the CPU, or realized as hardware with a wired logic. In addition, processing procedures, controlling procedures, specific names, data, and information including parameters can be changed except as otherwise specified.

Each of the processes explained in the above embodiments can be realized by a computer program. The computer program is executed by a computer system such as a personal computer, a work station, or the like. An example of the computer system that executes a computer program having the same function as that is performed in the above embodiments is explained below.

Figure 11:
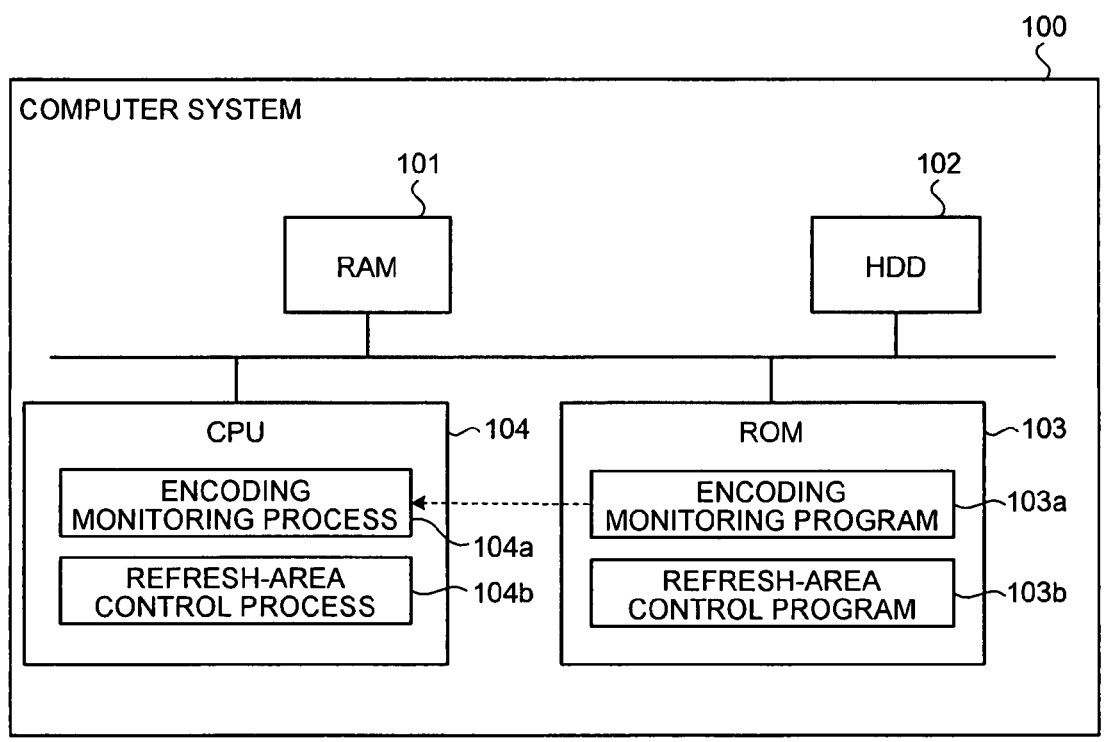
FIG. 11 is a block diagram of a computer system that executes an encoding program.
Figure 12:
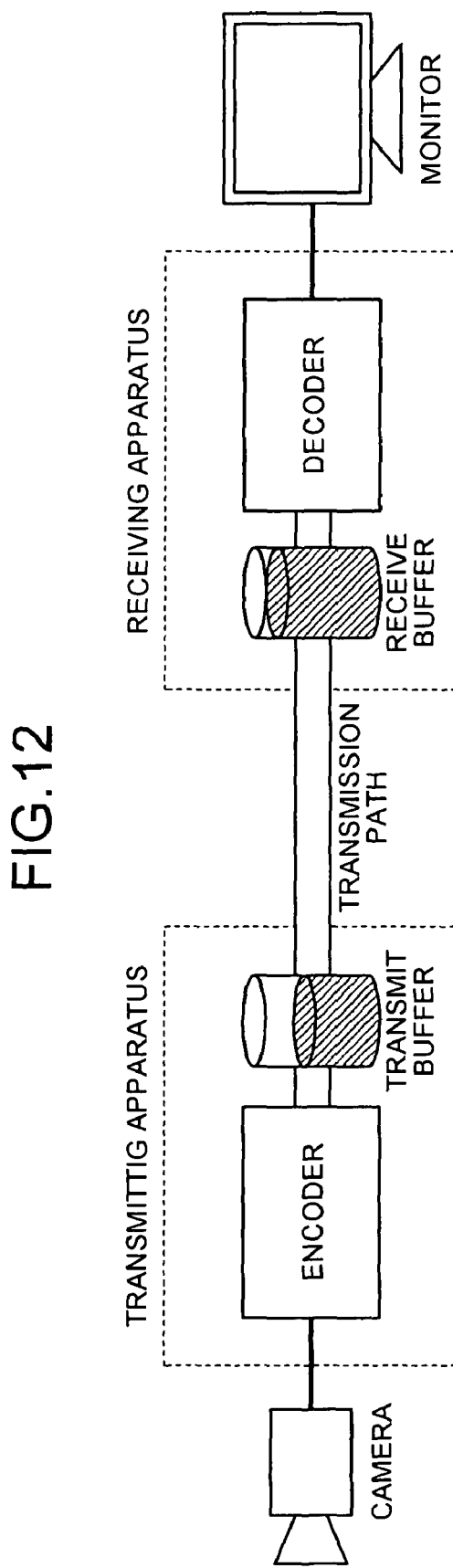

FIG. 11 is a block diagram of a computer system 100 that executes an encoding program. The computer system 100, includes a random access memory (RAM) 101, a hard disk drive (HDD) 102, a read-only memory (ROM) 103, and a CPU 104. The ROM 103 stores therein an encoding monitoring program 103a and a refresh-area control program 103b, which have the same function as that is performed in the above embodiments, in advance.

The CPU 104 reads out these programs 103a and 103b from the ROM 103, and executes these programs 103a and 103b as an encoding monitoring process 104a and a refresh-area control process 104b respectively. Incidentally, the encoding monitoring process 104a and the refresh-area control process 104b respectively correspond to the processes performed by the encoding-status monitoring unit 25 and the refresh-area control unit 26 shown in FIG. 2.

The programs 103a and 103b need not to be stored in the ROM 103. Alternatively, the programs 103a and 103b can be stored in "a portable physical recording medium" to be inserted into the computer system 100, such as a flexible disk (FD), a compact disk ROM (CD-ROM), a magneto-optical (MO) disk, a digital versatile disk (DVD), a magnetic optical disk, and an integrated circuit (IC) card, or "a fixed physical recording medium" to be installed inside or outside the computer system 100, such as an HDD. Moreover, it is also possible to store the programs 103a and 103b in "other computer system" connected to the computer system via a public line, the Internet, a local area network (LAN), a wide area network (WAN), or the like so that the computer system 100 can download the programs 103a and 103b from other computer system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for encoding a picture by inserting an intra-refresh area into a portion of the picture periodically based on an intra-refresh period, the apparatus comprising:
    an encoding-status monitoring unit that monitors whether the picture is replaced with either one of a picture having a small bit amount and a skip picture as an alternative picture; and
    a refresh-area control unit that changes the intra-refresh area by inserting the intra-fresh area supposed to be inserted into the portion of the picture into a portion of a subsequent picture according to the intra-refresh period when the encoding-status monitoring unit determines that the picture is replaced with the alternative picture.

2. The apparatus according to claim 1, wherein the refresh-area control unit changes the intra-refresh area by inserting the intra-refresh area into the portion of the subsequent picture together with an intra-refresh area to be inserted into the subsequent picture.

3. The apparatus according to claim 1, wherein the refresh-area control unit changes the intra-refresh area by inserting the intra-refresh area into a plurality of subsequent pictures in a divided manner.

4. An apparatus for encoding a picture by inserting an intra-refresh area into a portion of the picture periodically based on an intra-refresh period, the apparatus comprising:
    an encoding-status monitoring unit that monitors an encoding status of the picture and an encoding difficulty indicating a level of difficulty in encoding the picture based on the encoding status; and
    a refresh-area control unit that expands the intra-refresh area so that the intra-fresh period is shortened when the encoding difficulty is below a predetermined lower-limit value, the and narrows the intra-refresh area so that the intra-refresh period is lengthened when the encoding difficulty exceeds a predetermined upper-limit value.

5. The apparatus according to claim 4, wherein
the encoding-status monitoring unit monitors an amount of fluctuation in an image quality of the picture from a previous picture as the encoding difficulty, and
when the amount of fluctuation is below a predetermined lower-limit value, the refresh-area control unit expands the intra-refresh area so that the intra-refresh period is shortened, and
when the amount of fluctuation exceeds a predetermined upper-limit value, the refresh-area control unit narrows the intra-refresh area so that the intra-refresh period is lengthened.

6. The apparatus according to claim 4, wherein
the encoding-status monitoring unit monitors an amount of fluctuation in an activity of the picture from a previous picture as the encoding difficulty, and
when the amount of fluctuation exceeds a predetermined upper-limit value, the refresh-area control unit expands the intra-refresh area so that the intra-refresh period is shortened, and
when the amount of fluctuation is below a predetermined lower-limit value, the refresh-area control unit narrows the intra-refresh area so that the intra-refresh period is lengthened.

7. A method of encoding a picture by inserting an intra-refresh area into a portion of the picture periodically based on an intra-refresh period, the method comprising:
using a processor to perform the steps of:
monitoring whether the picture is replaced with either one of a picture having a small bit amount and a skip picture as an alternative picture; and
changing the intra-refresh area by inserting the intra-refresh area supposed to be inserted into the portion of the picture into a portion of a subsequent picture according to the intra-refresh period when the monitoring determines that the picture is replaced with the alternative picture.

8. A non-transitory computer-readable recording medium that stores therein a computer program for encoding a picture by inserting an intra-refresh area into a portion of the picture periodically based on an intra-refresh period, the computer program causing a computer to execute:
monitoring whether the picture is replaced with either one of a picture having a small bit amount and a skip picture as an alternative picture; and
changing the intra-refresh area by inserting the intra-refresh area supposed to be inserted into the portion of the picture into a portion of a subsequent picture according to the intra-refresh period when the monitoring determines that the picture is replaced with the alternative picture.

9. A method of encoding a picture by inserting an intra-refresh area into a portion of the picture periodically based on an intra-refresh period, the method comprising:
using a processor to perform the steps of:
monitoring an encoding status of the picture and an encoding difficulty indicating a level of difficulty in encoding the picture based on the encoding status; and
expanding the intra-refresh area so that the intra-refresh period is shortened when the encoding difficulty is below a predetermined lower-limit value, and narrowing the intra-refresh area so that the intra-refresh period is lengthened when the encoding difficulty exceeds a predetermined upper-limit value.

10. A non-transitory computer-readable recording medium that stores therein a computer program for encoding a picture by inserting an intra-refresh area into a portion of the picture periodically based on an intra-refresh period, the computer program causing a computer to execute:
monitoring an encoding status of the picture and an encoding difficulty indicating a level of difficulty in encoding the picture based on the encoding status; and
expanding the intra-refresh area so that the intra-refresh period is shortened when the encoding difficulty is below a predetermined lower-limit value, and narrowing the intra-refresh area so that the intra-refresh period is lengthened when the encoding difficulty exceeds a predetermined upper-limit value.

* * * * *

UNITED STATES PATENT AND TRADEMARK OFFICE
CERTIFICATE OF CORRECTION

| | | |
|---|---|---|
| PATENT NO. | : 7,974,479 B2 | Page 1 of 1 |
| APPLICATION NO. | : 11/907521 | |
| DATED | : July 5, 2011 | |
| INVENTOR(S) | : Noriaki Tsukuda et al. | |

It is certified that error appears in the above-identified patent and that said Letters Patent is hereby corrected as shown below:

Column 15, Line 2, In Claim 4, delete "the and" and insert --and--, therefor.

Signed and Sealed this
Eighth Day of November, 2011

David J. Kappos
*Director of the United States Patent and Trademark Office*